United States Patent
Hsia

[19]

[11] Patent Number: 5,927,317
[45] Date of Patent: Jul. 27, 1999

[54] VENTING STRUCTURE OF A WATERBED

[76] Inventor: Yu Chun Hsia, No. 3, Chiao Ai 9th Road, Hsin Tien City, Taipei Hsien, Taiwan

[21] Appl. No.: 09/026,426

[22] Filed: Feb. 19, 1998

[51] Int. Cl.[6] ....................................................... F16T 1/20
[52] U.S. Cl. ................................... 137/202; 5/671; 5/673
[58] Field of Search ........................ 5/671, 673; 137/202, 137/198

[56] References Cited

U.S. PATENT DOCUMENTS

| | | | |
|---|---|---|---|
| 4,470,164 | 9/1984 | Soderstrom et al. ........................ | 5/671 |
| 4,860,805 | 8/1989 | Townsend ................................. | 5/671 X |
| 5,056,171 | 10/1991 | Larson ........................................ | 5/673 |
| 5,101,852 | 4/1992 | Magnasco ............................. | 137/202 X |
| 5,582,198 | 12/1996 | Nagino et al. ....................... | 137/202 X |

Primary Examiner—Brian K. Green
Assistant Examiner—Rodrigo J. Morales
Attorney, Agent, or Firm—Rosenberg, Klein & Bilker

[57] ABSTRACT

A venting valve assembly for a waterbed having a water compartment is provided. The assembly includes an exhaust port for the water compartment which includes a stem portion, an upper cover threadedly coupled to that stem portion, and a lower cover also coupled to the stem portion. Defined within the stem portion is a valve chamber with which a vent hole through an upper wall of the stem portion and a plurality of through holes in the lower cover are in open communication. The assembly also includes a pontoon disposed within the valve chamber for buoyant displacement responsive to entry of water into that valve chamber. The pontoon is formed with a substantially hollow body to which a resilient plug cover is coupled, and on which a plurality of outwardly protruding strips are formed. As water from the waterbed's water compartment enters the valve chamber, the pontoon is displaced buoyantly upward until the resilient plug cover engages the vent hole. As water exits the valve chamber, the pontoon descends to disengage the vent hole, so as to enable release of gas therethrough.

5 Claims, 6 Drawing Sheets

VENTING STRUCTURE OF A WATERBED

BACKGROUND OF THE INVENTION

Generally, in a waterbed structure, a water inlet and an exhaust port are needed to vent air as the given waterbed's water compartment is filled with water. While the water is being filled, the exhaust port is opened so that air within the water compartment of the waterbed may vent out. If air remains within the water compartment of the waterbed, a disturbingly loud sound of water flowing within the water compartment may be emitted to a user lying on the waterbed. Also, with extended use, air may gradually collect within the compartment. If this air is not effectively vented out, the waterbed will lack softness and elasticity.

Generally, the structure of exhaust ports known in the prior art are such that the air in the water compartment will not be adequately released. Often, in releasing the air, water is also released. Prior art exhaust ports are typically formed simply with a hole for access to the water compartment and a plug cover therefor. The plug cover is opened during venting, and since water within the waterbed is under an inner pressure, it will tend to flow out, potentially wetting the waterbed's outer surface. The water will also tend to block the release of air retained within the water compartment until it is removed by flow out of the compartment. This is a drawback that must be overcome.

In U.S. patent application Ser. No. 08/877,183, filed by the inventor of the present invention, a floating ball is installed within the exhaust port, and a lattice cover for covering a through hole prevents the floating ball from being released. Thus, only water and air are permitted to flow through the hole. A space having an upper portion of conic shape is formed between the cover and the exhaust port to receive the floating ball. The venting of air is then controlled by exploiting both the buoyancy and the weight of the floating ball. When the water flows to the exhaust port, the floating ball rises to rest against the outlet of the conic space so that water is prevented from flowing out. When air is released to the exhaust port, the water level declines, causing the floating ball to descend. The conic portion which had been blocked by the ball is thereby opened to allow the air to vent out. This structure, however, does not sufficiently prevent the flow of water out the exhaust port. A need, therefore, exists for a more effective venting valve assembly.

SUMMARY OF THE INVENTION

In accordance with the present invention, a pontoon of improved structure is provided so that the air surrounding the exhaust port as well as the air within the water compartment may be fully vented out while the release of water is prevented.

In order to achieve this and other objects, a pontoon is buoyantly disposed within a valve chamber of an exhaust port, and a plug cover provided on the pontoon is used to prevent the flow of water out of the water compartment. As the water level within the valve chamber declines, the pontoon descends so that the air within the chamber may vent out. Substantially all the air within the water compartment will thus be exhausted.

In accordance with the present invention, if the water has not fully filled the water compartment, the pressure inside the compartment will be lower than the pressure outside the compartment. In this condition, the air released from the water compartment may be drawn back into the water compartment. A second plug cover may be further installed on a lower end of the pontoon, the second plug cover having a conic pillar for tightly engaging a through hole of a lower cover so that the air entering the valve chamber will not flow back to the water compartment via that through hole.

BRIEF DESCRIPTION OF THE DRAWINGS

The present invention will be better understood and its numerous object and advantages will become apparent to those skilled in the art by referencing the following drawings in which.

DETAILED DESCRIPTION OF THE PREFERRED EMBODIMENTS

Figure 1:
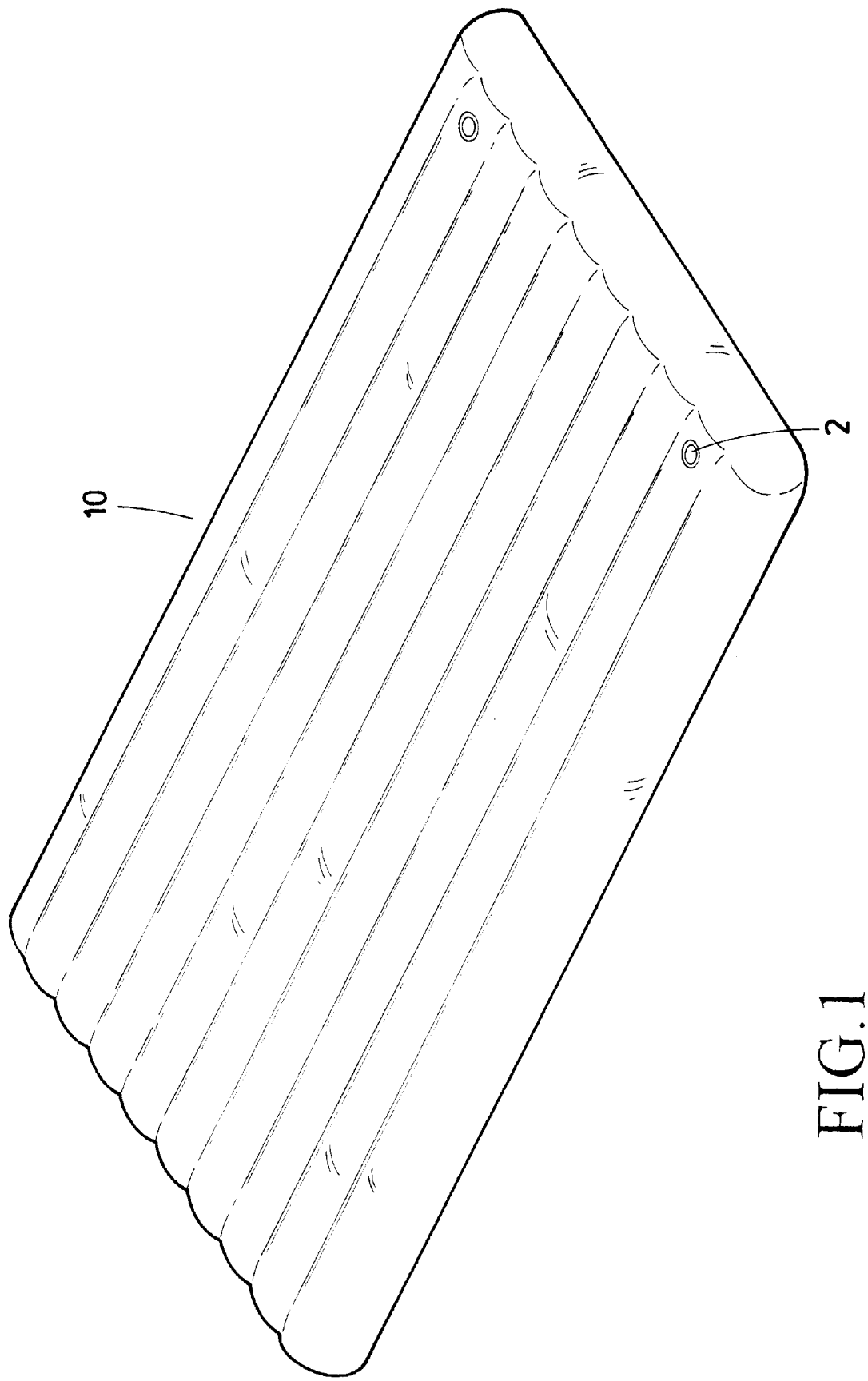
FIG. 1 is a perspective view of a waterbed employing the venting valve assembly of the present invention.
Figure 2:
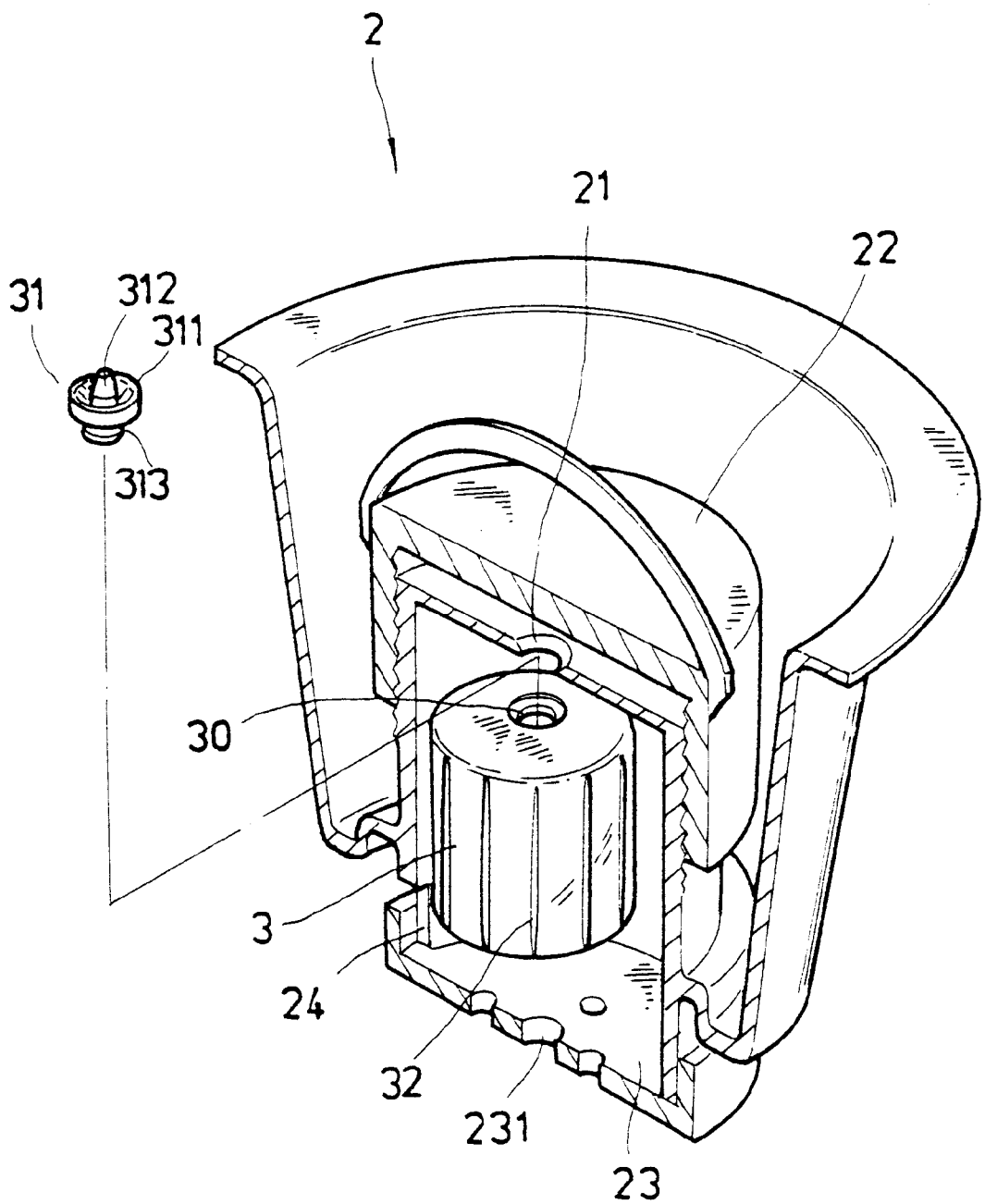
FIG. 2 is an exploded perspective sectional view of one embodiment of the present invention, partially cut-away.
Figure 3:
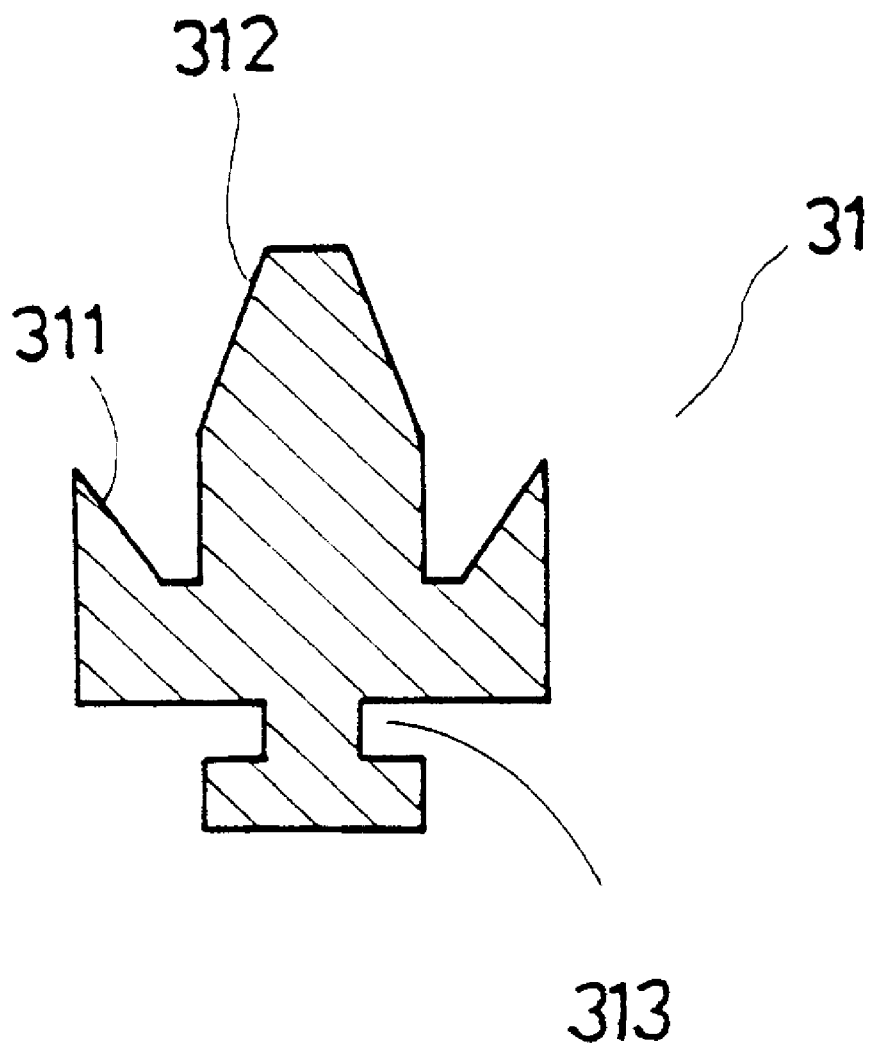
FIG. 3 is a sectional view of one embodiment of the plug cover in the present invention.

Referring to FIGS. 1–3, the present invention is directed to a venting valve assembly for a waterbed having a water compartment. An exhaust port 2 is installed at a predetermined position through a plastic layer of a waterbed 10. The exhaust port 2 includes a stem having a top wall through which a vent hole 21 is formed. The outer side wall of the stem of the exhaust port 2 is externally threaded for the coupling of a threaded upper cover 22 to the stem. The upper cover 22 extends over the vent hole 21 when so coupled to the stem. To the lower end of the stem is coupled a lower cover 23 in which a plurality of through holes 231 are formed. Lower cover 23 substantially encloses a valve chamber within which a pontoon 3 is disposed.

The pontoon 3 is formed having a hollow cylindrical body through which a receiving hole 30 is formed. A resilient plug cover 31 is coupled to the receiving hole 30. The plug cover 31 is formed with a flange 311 coaxially disposed about an upwardly-projecting conic pillar 312. An annular groove 313 is formed on the lower end of the plug cover 31. By sufficiently inserting plug cover 31 such that annular groove 313 is inserted into the receiving hole 30, the plug cover 31 may be secured to the pontoon 3.

The pontoon 3 is also formed with a plurality of protruding strips 32 extending along the outer periphery of the body of the pontoon 3. Strips 32 serve to prevent the pontoon body from contacting the side wall of the stem, such that surface adhesion and blockage of air are prevented.

Figure 4:
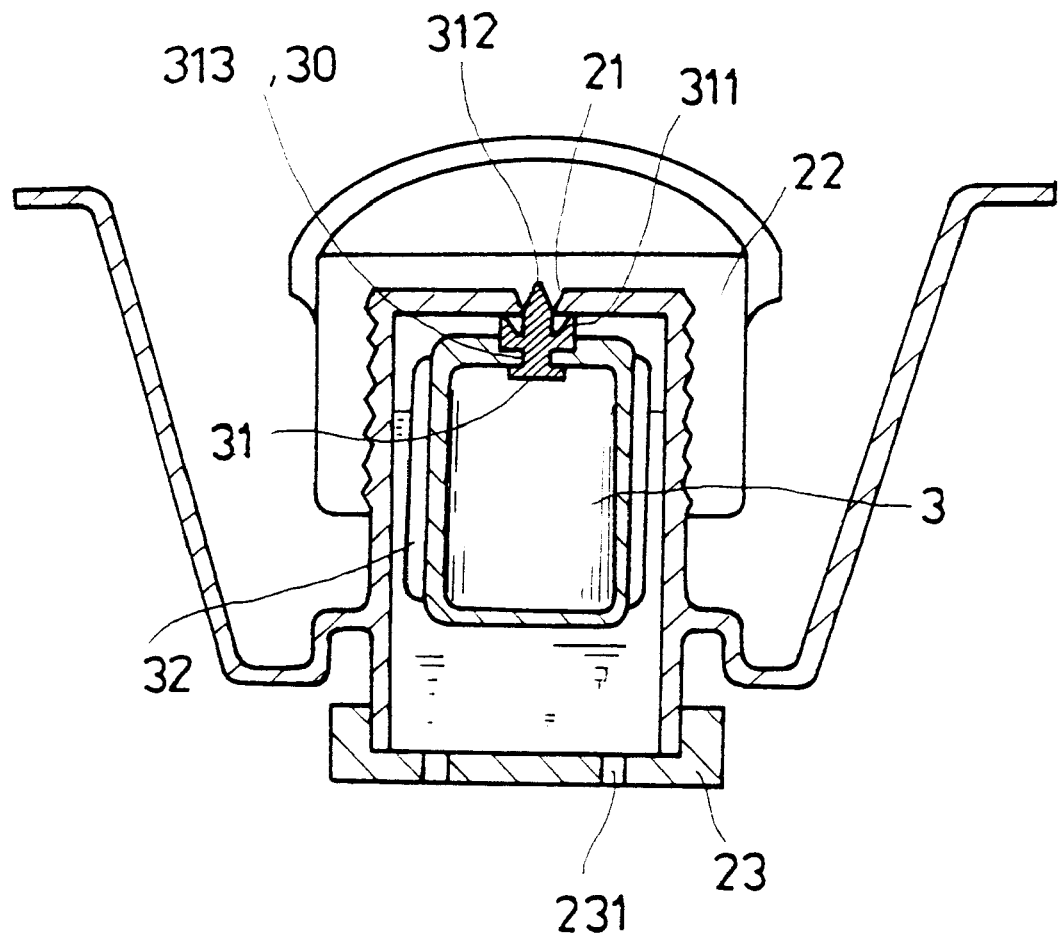
FIG. 4 is a schematic sectional view of one embodiment of the present invention showing a pontoon in a sealing position.
Figure 5:
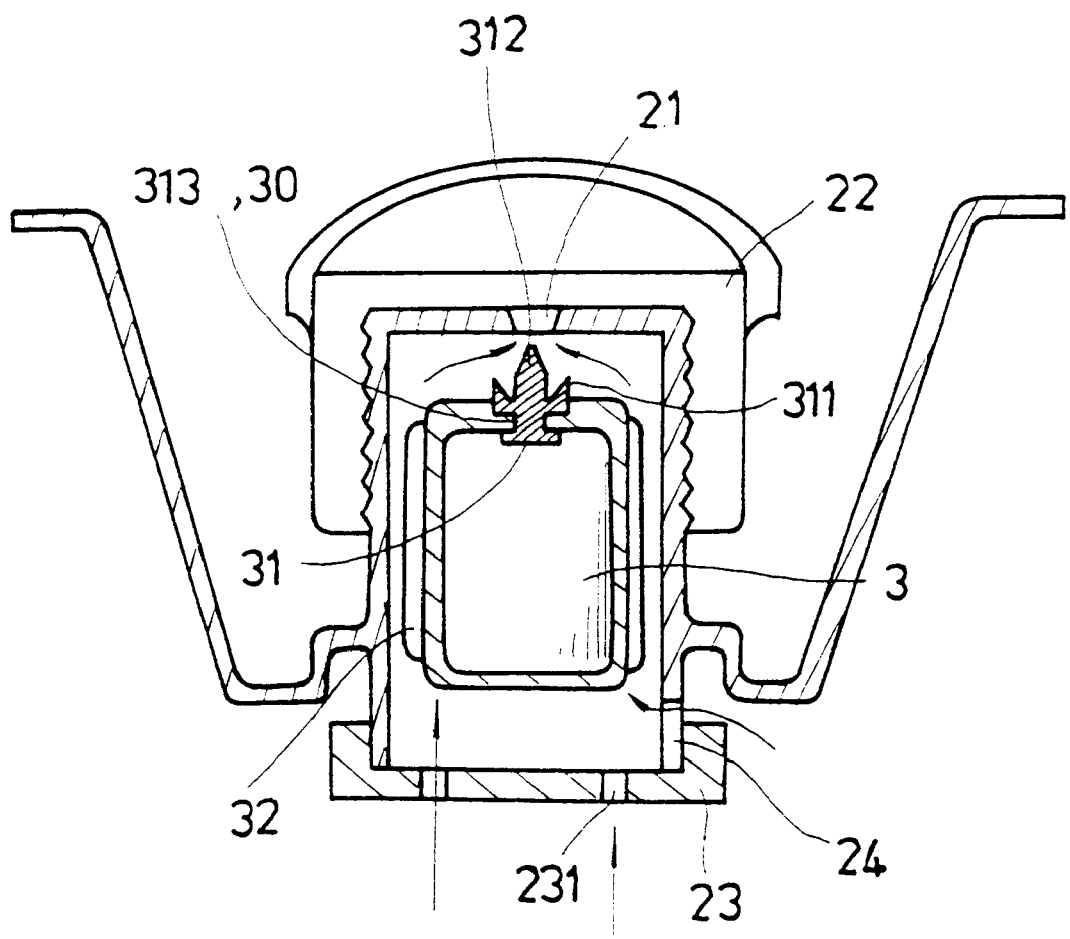
FIG. 5 is a schematic sectional view of the present invention showing the pontoon descending from its sealing position; and, FIG. 6 is a schematic sectional view of another embodiment in the present invention showing the pontoon in a second sealing position.

Referring to FIGS. 4 and 5, when water is introduced into the waterbed 10 or released therefrom, the gas within the waterbed's water compartment must be vented. As the water within the water compartment flows into the valve chamber of the exhaust port 2, the pontoon 3 will rise due to its buoyancy to a sealing position at which the conic pillar 312 of its plug 31 engages the vent hole 21. The water's release from the valve chamber is thus prevented. As gas passes to the side and lower periphery of the exhaust port 2 and into the valve chamber, the water already in the valve chamber will be displaced therefrom, causing the pontoon 3 to descend. The vent hole 21 is then unblocked to permit the gas to vent out.

Importantly, the pontoon 3 of the present invention preferably includes a plug cover 31 having in addition to a conic pillar 312 for engaging the vent hole 21, a flange 311 radially extending about the conic pillar 312 which effectively adheres tightly against the upper wall of the exhaust port's stem when the pontoon 3 rises to its sealing position. In addition to reinforcing the seal of the vent hole 21, the engagement further helps to insure that the conic pillar 312 rests squarely within the vent hole 21.

In order to effect full release of gas from the water compartment of the waterbed, a guiding slot 24 is formed in the lower portion of the stem of the exhaust port 2. This guiding slot 24 facilitates passage into the valve chamber of gas retained laterally about the exhaust port stem without having to await displacement to a through hole 231 of the lower cover 23. Venting of this gas is thus allowed to occur more readily.

In accordance with one aspect of the present invention, since the pressure within a filled water compartment of the waterbed is greater than the pressure outside the waterbed, a plug cover 31 is installed on the pontoon 3 to effectively vent air within the water compartment without the concurrent release of water. If, however, the water compartment has not fully filled, the pressure inside the compartment will be lower than the pressure outside the compartment. In this condition, the air outside the water compartment will tend to flow back into the compartment.

Figure 6:
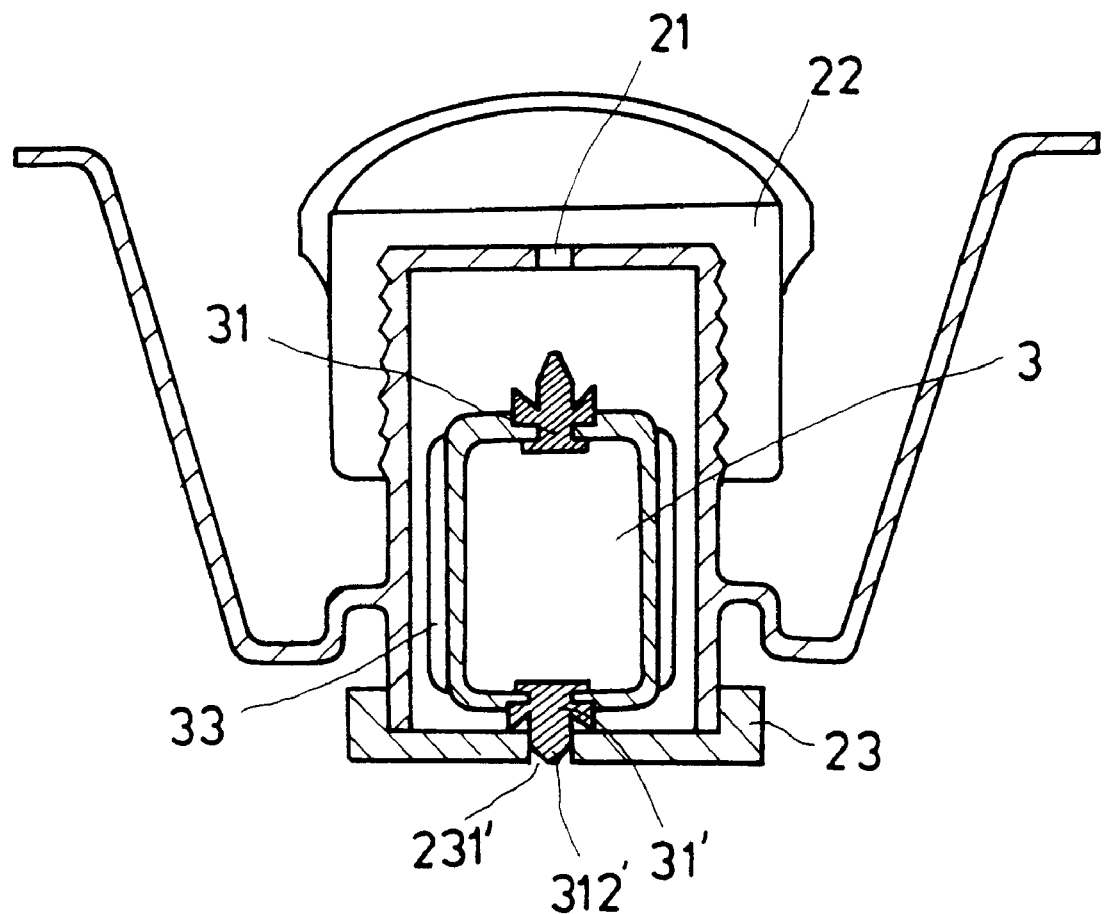

In another embodiment of the present invention shown in FIG. 6, a second plug cover 31' is, therefore, coupled to the lower end of the pontoon 3. The second plug cover 31' is formed with a conic pillar 312' adapted to engage a through hole 231' of the lower cover 23 in substantially sealed manner when the pontoon 3 descends within the valve chamber to a second sealing position. Such sealing engagement prevents the re-entry of air from the valve chamber back into the water compartment. Thus this design provides great advantages to the structure of the waterbed.

Those skilled in the art will readily recognize various modifications and changes which may be made to the present invention without strictly following the exemplary embodiments and any application thereof illustrated and described herein, and without departing from the true spirit and scope of the present invention which is set forth in the following claims.

What is claimed is:

1. A venting valve assembly for a release of air from a water compartment of a waterbed comprising:
   (a) an exhaust port for said water compartment, said exhaust port including:
      (1) a stem portion having a threaded sidewall extending axially from an upper wall to define a valve chamber, said upper wall having a vent hole passing therethrough for open communication with said valve chamber;
      (2) an upper cover threadedly coupled to said stem portion for removably covering said vent hole; and,
      (3) a lower cover coupled to said stem portion for substantially enclosing said valve chamber, said lower cover having a plurality of through holes formed therein for open communication with said valve chamber; and,
   (b) a pontoon disposed within said valve chamber for buoyant displacement responsive to entry of water into said valve chamber, said pontoon including:
      (1) a substantially hollow body perforated to define a receiving hole;
      (2) a resilient plug cover coupled to said receiving hole, said plug cover having a conic portion projecting therefrom for engaging said vent hole in substantially sealed manner when said pontoon is disposed at a sealing position within said valve chamber; and,
      (3) a plurality of outwardly protruding strips formed on said body for maintaining said body in spaced relation to said sidewall of said exhaust port stem portion.

2. The venting valve assembly as recited in claim 1 wherein at least one guiding slot is formed in said sidewall of said exhaust port stem portion, adjacent said lower cover coupled thereto, said guiding slot being in open communication with said valve chamber.

3. The venting valve assembly as recited in claim 1 wherein said plug cover includes an annular flange portion coaxially disposed about said conic portion and an annular groove formed adjacent thereto.

4. The venting valve assembly as recited in claim 1 wherein said pontoon further includes at least a second plug cover, said second plug cover having a conic portion projecting therefrom for engaging one of said through holes of said exhaust port lower cover in substantially sealed manner when said pontoon is disposed at a second sealing position within said valve chamber, whereby passage of air from said valve chamber to the water compartment through said through hole is prevented.

5. The venting valve assembly as recited in claim 3 wherein said pontoon further includes at least a second plug cover, said second plug cover having a conic portion projecting therefrom for engaging one of said through holes of said exhaust port lower cover in substantially sealed manner when said pontoon is disposed at a second sealing position within said valve chamber, whereby passage of air from said valve chamber to the water compartment through said through hole is prevented.

* * * * *